United States Patent [19]

Bürkle et al.

[11] 4,436,252
[45] Mar. 13, 1984

[54] TENSION SHAFT FOR WINDING FRAMES

[76] Inventors: Wolfgang Bürkle, Zum Bohrturm 3, 3250 Hameln 1; Dieter Opitz, Ringstrasse 32, 8671 Forbau, both of Fed. Rep. of Germany

[21] Appl. No.: 411,788

[22] Filed: Aug. 26, 1982

[30] Foreign Application Priority Data

Aug. 28, 1981 [DE] Fed. Rep. of Germany ... 8125169[U]

[51] Int. Cl.³ .................. B23B 31/40; B23B 5/22; B65H 75/18
[52] U.S. Cl. .................. 242/72 B; 269/48.1; 279/2 R
[58] Field of Search .................. 242/72 B, 68.2; 269/48.1; 279/2 R; 285/189, 192

[56] References Cited

U.S. PATENT DOCUMENTS

| | | | |
|---|---|---|---|
| 2,605,140 | 7/1952 | Bartling | 285/192 |
| 3,139,242 | 6/1964 | Banlier | 242/72 B |
| 3,214,109 | 10/1965 | Gadde et al. | 242/72 B |
| 3,834,257 | 9/1974 | Ganser | 242/72 B |

FOREIGN PATENT DOCUMENTS

| | | | |
|---|---|---|---|
| 653299 | 12/1962 | Canada | 242/72 B |
| 654990 | 1/1963 | Canada | 242/72 B |

Primary Examiner—Stuart S. Levy
Assistant Examiner—Lloyd D. Doigan
Attorney, Agent, or Firm—Blum, Kaplan, Friedman, Silberman and Beran

[57] ABSTRACT

A tension shaft for machines for winding widths of sheet material wherein the outside diameter is variable is provided. The tension shaft includes a flexible tube wound thereabout in helical fashion which may be inflated by air fed into the central portion of the tension shaft. A valve for air feed discharge is provided to the central shaft. An air inlet from the central shaft to the flexible tube is provided. The air inlet is characterized by a screw member having an axial opening leading from the central shaft piece to a radial opening extending outwardly from the axial hole for directing air to the interior portion of the flexible tube.

13 Claims, 5 Drawing Figures

TENSION SHAFT FOR WINDING FRAMES

BACKGROUND OF THE INVENTION

This invention relates to a tension shaft for machines for winding widths of sheet material, and more particularly to a tension shaft including a central shaft having an outside diameter which may be altered by air fed into or withdrawn from a flexible tube wound thereabout.

In an adjustable tension shaft assembly for a winding frame, the frame becomes firmly coupled to the tension shaft upon increasing the diameter of the shaft. It is known to alter the outside diameter by inflating a flexible tube on the outer surface of the tension shaft. For example, in a known tension shaft of this type as disclosed in German Pat. No. 2,655,935, several tube units are uniformly distributed over the periphery and extend parallel to each other in the longitudinal direction of the tension shaft. Air is fed into the tubes by means of a central valve arranged at one end of the shaft and a connecting central hole with radial channels running into the different hose elements.

An inlet is provided as a transition between the radial holes and the individual tube part. The inlet is formed by a plate with a central support projecting into the radial channel. The plate lies inside the tube and the support is kept firmly in the radial channel by clamp elements. This construction generally does not withstand the centrifugal forces which arise at high rotation rates. Plates clamped with pegs tend to loosen at appropriate loads which leads to rendering the tension shaft unsuitable for further use. In addition, mounting of the conventional air inlets is relatively costly. Finally, the plate, which must be applied tightly to the inside of the tube area, must be designed in a relatively large size in order to provide sufficient tightness which is obtainable only with a plate of large surface area. Additionally, the assembly cost for replacing such a tube, which is necessary after a certain operating time, is also relatively costly.

In another known solution described in German application No. 8,004,622, a tube is wound in spiral fashion about a central shaft piece. In this construction, the tube is placed on a central valve provided on one side of the shaft and is fastened with a clamp. The tube is also slightly bent as it emerges to the outside of the central shaft piece. This tends to cause disturbances in the air currents or tends to rupture the tube at the location of this transition to the end of the central shaft piece. Similarly, in the case of wear of the valve and/or the tube, replacement of the worn part is only possible by extensive assembly work.

Accordingly, it would be desirable to provide a tension shaft having an adjustable outside diameter so as to provide a simple and wear-resistant assembly including a flexible tension tube having an air inlet and valve which may be also readily assembled or disassembled.

SUMMARY OF THE INVENTION

Generally speaking, in accordance with the invention, a tension shaft assembly for machines for the winding of widths of sheet material is provided. The outside diameter of the tension shaft is variable by feeding air into or removing air from a flexible tube wound about the shaft. A valve is provided for air feed or discharge into the center of the tension shaft and an air inlet is disposed between the interior of the central shaft and the interior of the tube for providing an air passage to the tube.

The air inlet from the central shaft to the tube is formed from a screw having an axial opening therethrough and a radial hole emanating from the axial opening. The shaft of the screw is surrounded by an intermediate piece which is inserted into the tube. The intermediate piece is formed with openings for providing the air from the radial hole of the screw to the interior of the tube. The intermediate piece is clamped in position by a screw head so that the upper and lower interior surfaces of the intermediate piece abut the upper and lower interior surfaces of the tube.

Accordingly, it is an object of the invention to provide an improved tension shaft.

It is another object of the invention to provide an improved air inlet for a flexible tube wound about a tension shaft.

It is a further object of the invention to provide an improved tension shaft for machines for the winding of widths of sheet material.

Still another object of the invention is to provide an improved air inlet for a flexible tube on a tension shaft for a machine for winding widths of fabric.

Still a further object of the invention is to provide an improved tension shaft for machines for the winding of widths of fabric wherein the outside diameter may be altered by inflating a flexible tube wound thereabout.

Yet another object of the invention is to provide improved tension shaft for machines for the winding of widths of fabric wherein the outside diameter may be altered by inflating a flexible tube wound thereabout, including an air inlet characterized by a screw engaged with an intermediate piece in the interior of the tube, the screw having an axial opening and radial hole emanating therefrom.

Still other objects and advantages of the invention will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
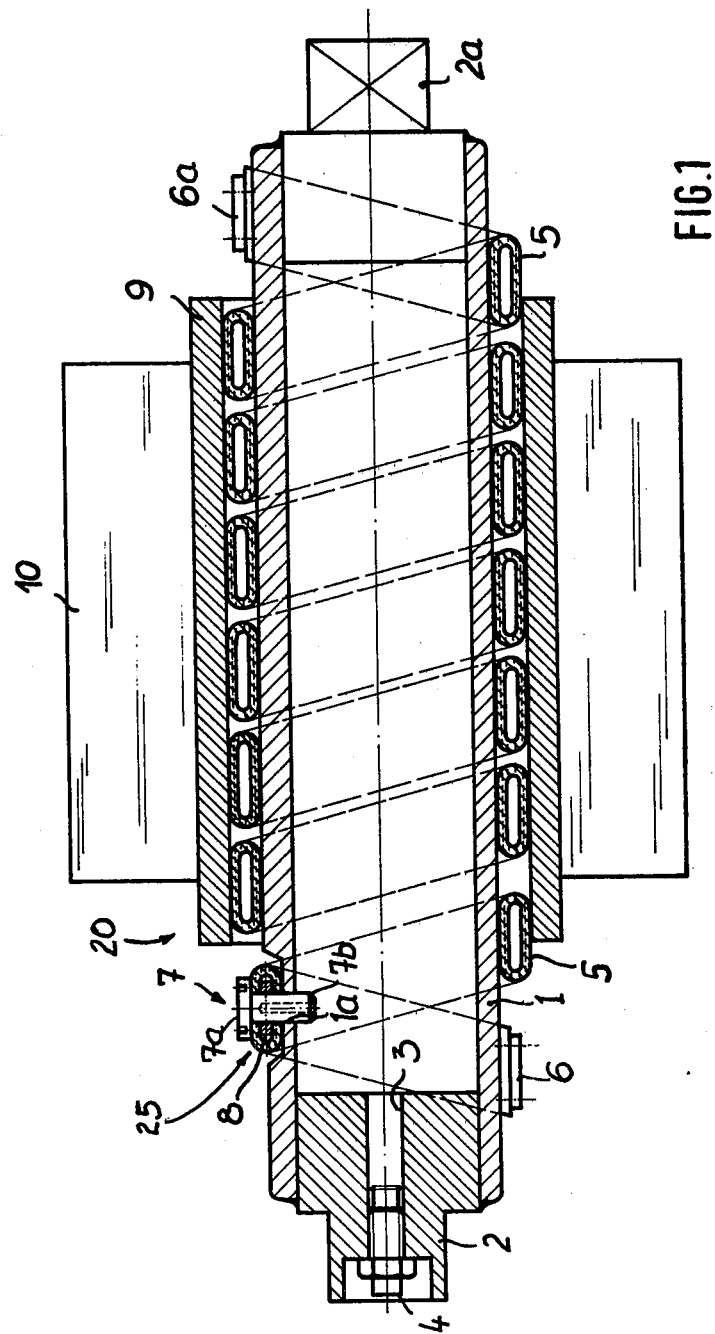
FIG. 1 is a cross-sectional view of a longitudinal section of a first embodiment of a tension shaft for a machine for the winding of widths of sheet material constructed and arranged in accordance with the invention.

A tension shaft assembly 20 constructed and arranged in accordance with the invention is shown schematically in a longitudinal cross-section in FIG. 1. A central shaft piece 1 is formed from a pipe length includes a left insert 2 and a right insert 2a at each end thereof. Inserts 2 and 2a are formed with a square section in a radial section for engaging with the uptake in a winding device. Left insert 2 is formed with a central axial opening 3 which leads into the interior of central shaft piece 1. Insert 2 includes an air valve 4 screwed into central axial opening 3 at the outside end of insert 2. A flexible tube 5 is wound around central shaft piece 1 in helical form. Tube 5 is clamped air tight at both ends and is attached to central shaft piece 1 with fastening elements 6 and 6a.

An air inlet 25 is formed at one end of tube 5 and includes a screw 7 having a screw head 7a and a screw shaft 7b. Screw 7 penetrates through tube 5 and an intermediate piece 8 disposed within tube 5. Intermediate piece 8 is formed in the configuration of a disc having a central through-hole 8b. Intermediate piece 8 is also formed with a radial hole 8a between inner circular ring groove 15 formed in the inner wall and the outer wall of intermediate piece 8. Screw shaft 7b is screwed into a tapped hole 1a formed in the wall of central shaft piece 1 and extends into the interior of central shaft 1. Tube 5 is clamped from its outside at the lower side of screw head 7a and the opposite bearing surface, the outside wall of central shaft 1. Intermediate piece 8 lies inside tube 5 with its upper side compressed against the interior surface along the upper region of tube 5 and with its lower surface compressed against the interior surface of the lower area of tube 5. A frame 9 with a winding element 10 is disposed on tension shaft 20. Frame 9 becomes firmly engaged to tension shaft 20 upon inflation of tube 5.

Figure 2:
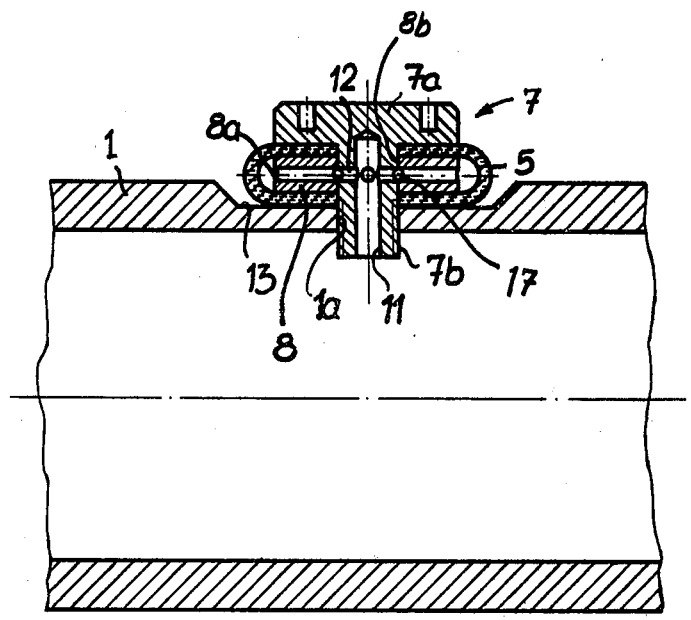
FIG. 2 is a cross-sectional view in longitudinal section of the air inlet section of the tension shaft illustrated in FIG. 1.

Air inlet 25 from central shaft 1 to tube 5 is illustrated in greater detail in FIG. 2. Screw 7 with screw head 7a and screw shaft 7b is formed with an axial opening 11 through screw shaft 7b which terminates in screw head 7a. Screw shaft 7b is also formed with at least one radial hole 12 which is disposed in cooperation with at least one radial hole 8a formed in intermediate piece 8. Radial hole 8a is disposed for providing an air passage on the one hand from the outer sides of intermediate piece 8 to, on the other hand, inner circular ring groove 15 formed in central through-hole 8b of intermediate piece 8. Inner ring groove 15 aligns with and cooperates with an outer circular ring groove 16 formed on shaft 7b of screw 7. Ring groove 15 and circular ring groove 16 cooperate to form a circular ring channel 17 between screw shaft 7a and intermediate piece 8. Air is transmitted from the interior of central shaft piece 1 by way of axial opening 11 and radial hole 12 in screw shaft 7b and radial hole 8a formed in intermediate piece 8 into the interior of tube 5.

Central shaft piece 1 is designed so as to be vertical with respect to the radius of a running plane 13 along central shaft piece 1 on the outside surface beneath screw head 7.

Figure 4:
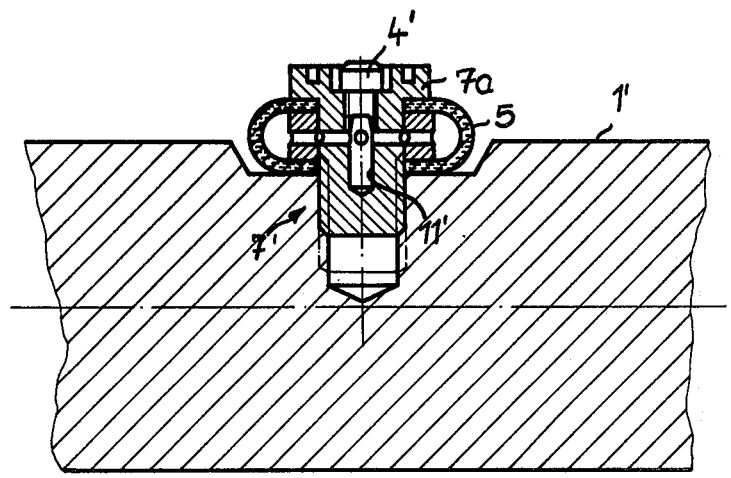
FIG. 4 is a cross-sectional view of an air inlet section including an air valve in accordance with a further embodiment of the invention.

In the embodiment illustrated in FIG. 4, a valve 4' is screwed into the center of a screw head 7a'. An axial hole 11' is formed in this manner as a blind hole which is closed beneath valve 4' for providing an air inlet to tube 5.

Figure 5:
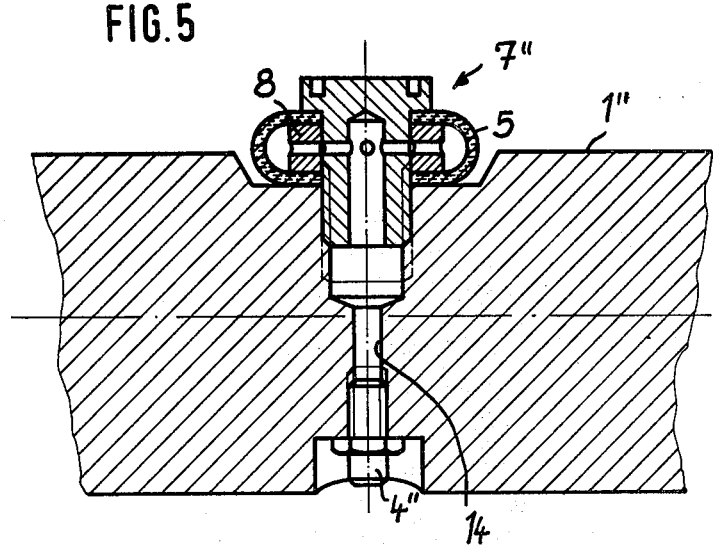
FIG. 5 is a cross-sectional view of the air inlet section with an air valve at the end of a radial channel lying opposite the air inlet in accordance with a third embodiment of the invention.

In the embodiment illustrated in FIG. 5, a valve 4" is disposed at the end of a radial channel 14 through a massive wall of a central shaft piece 1". In accordance with this embodiment of the invention, it is also possible to couple the air feed channel with a central opening running through the shaft axis to a valve located at the front end thereof.

Figure 3:
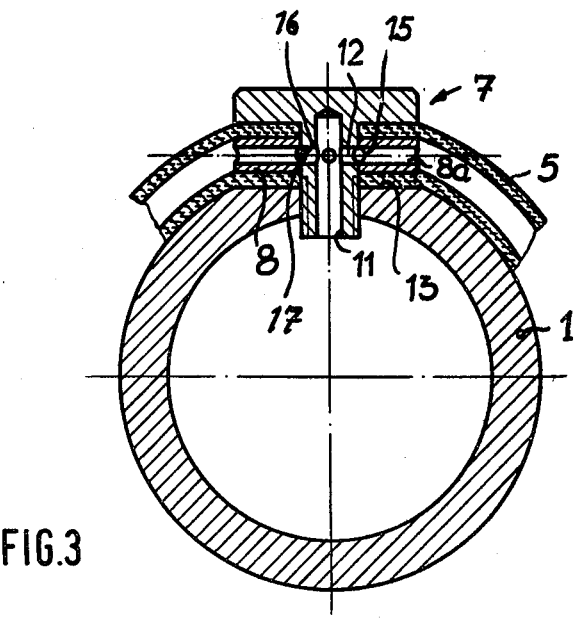
FIG. 3 is a cross-sectional view of the air inlet section illustrated in FIG. 2 in a section perpendicular to the showing in FIG. 2.

In accordance with the preferred embodiment of the invention, it is preferable for intermediate piece 8 to be shaped in the form of a disc with at least one radial hole 8a extending from radial hole 12 in screw shaft 7b to the interior of tube 5. In a tension shaft constructed and arranged in accordance with this embodiment of the invention as illustrated in FIGS. 1-3, both the initial assembly and replacement of tube 5 and valve 4 can be done quite easily. It is sufficient to insert intermediate piece 8 at one end of tube 5 and then place tube 5 in the area over tapped hole 1a for receipt of fastening screw 7. All that is then required is that tube 5 be mounted by fastening screw 7 to tapped hole 1a. These operations can be conducted with minimal handling.

It is also been found particularly suitable for radial hole 12 of screw shaft 7b to open into circular outside groove 16 and for radial opening 8a of intermediate piece 8 to open into inside circular groove 15 and for both grooves to cooperate to form circular channel 17. In accordance with such a design, the connection between axial opening 11 of screw shaft 7b and the inside of intermediate piece 8 is provided in every rotary position of screw 7. In accordance with a preferred embodiment of the invention, an air valve 4' is introduced into screw 7'. Such a construction makes it possible to dispense with any additional holes in central shaft piece 1' for receiving valve 4'. Additionally, the invention also encompasses the embodiment wherein the outside region of central shaft piece 1 beneath screw head 7a is perpendicular with respect to the radius of running plane 13 of central shaft piece 1. Such a design provides particularly precise coupling in the region of air inlet to tube 5.

Accordingly, the tension shaft provided in accordance with the invention utilize an air inlet designed as a screw with an axial opening and radial holes emanating therefrom. The shaft of the screw is enveloped by an intermediate piece disposed in the tube which presents a side passage between the radial hole of the screw and the inside of the tube. The intermediate piece and tube which are clamped by the screw head provides a tight fit between the upper and lower side of the intermediate piece to the inside areas of the tube located opposite therefrom. By providing this solution, it is possible to provide tension shafts which may be utilized for winding machines for winding widths of various sheet material, such as a width of fabric, in addition to other types of sheet material, such as plastic and other types of films. The tension shafts constructed and arranged in accordance with the invention are particularly well suited for use in winding machines for winding widths of fabric.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a tension shaft for a winding machine including a central shaft piece for winding widths of sheet material thereon with a flexible tube wound about the outside of the central shaft piece, the outside diameter of the central shaft piece being variable by inflating or deflating the flexible tube, a valve for feeding or discharging air into the interior of the central shaft piece and an air inlet to the tube for coupling the interior of the central shaft piece with the interior of the flexible tube, the improvement which comprises an air inlet to the tube comprising a screw having a shaft and a screw head, an axial opening extending from the end of the screw shaft along the screw shaft, at least one radial hole emanating from the axial opening to the exterior of the screw shaft, an intermediate piece disposed within the tube, the intermediate piece adapted to receive the screw shaft and formed with at least one radial hole for cooperating with the radial hole in the screw shaft, the intermediate piece clamped to the interior surfaces of the flexible tube disposed opposite thereto by the screw head.

2. The tension shaft of claim 1, wherein the intermediate piece is formed in the shape of a disc.

3. The tension shaft of claim 1 or 2, wherein the screw shaft is formed with a circular outside groove along the radius of the radial hole and the intermediate piece is formed with a circular inner groove in the region of the radial hole, both circular grooves cooperating to form a circular channel about the screw shaft.

4. The tension shaft of claim 3, wherein an air valve is mounted to the screw.

5. The tension shaft of claim 3, wherein the outside surface area of the central shaft piece in the region of the air inlet where the screw is inserted into the wall of the shaft includes a substantially planar region formed perpendicular to a radius of the central shaft to the planar region.

6. The tension shaft of claim 3, wherein the screw shaft and intermediate piece each include a plurality of radial holes.

7. The tension shaft of claim 3, wherein the winding machine is for winding widths of fabric.

8. In a tension shaft for a winding machine including a central shaft piece for winding widths of sheet material thereon with a flexible tube wound about the outside of the central shaft piece, the outside diameter of the central shaft piece being variable by inflating or deflating the flexible tube, and an air inlet to the tube for inflating or deflating the flexible tube, the improvement which comprises an air inlet to the tube comprising a screw having a shaft and a screw head, an axial opening in the screw at least one radial hole emanating from the axial opening to the exterior of the screw shaft, an intermediate piece disposed within the tube, the intermediate piece adapted to receive the screw shaft and formed with at least one radial hole for cooperating with the radial hole in the screw, the intermediate piece clamped to the interior surfaces of the flexible tube disposed opposite thereto by the screw head and an air valve is mounted to the screw coupled to the axial opening.

9. The tension shaft of claim 8, wherein the air valve is inserted into the screw head and the axial opening in the screw shaft runs from the screw head and terminates in the screw shaft.

10. The tension shaft of claim 8, wherein the wall of the central shaft includes a radial channel and the air valve is inserted in the radial channel for coupling to the axial opening in the screw shaft, the axial opening extending from the end of the screw shaft towards the screw head.

11. In an air inlet for a tension shaft including a central shaft piece with a flexible tube wound about the outside of the central shaft piece, the outside diameter of the central shaft piece being variable by inflating or deflating the flexible tube, the improvement which comprises an air inlet to the tube comprising a screw having a shaft and a screw head, an axial opening extending from the end of the screw shaft along the screw shaft, at least one radial hole emanating from the axial opening to the exterior of the screw shaft, an intermediate piece disposed within the tube, the intermediate piece adapted to receive the screw shaft and formed with at least one radial hole for cooperating with the radial hole in the screw shaft, the intermediate piece clamped to the interior surfaces of the flexible tube disposed opposite thereto by the screw head.

12. The air inlet of claim 11, wherein the intermediate piece is formed in the shape of a disc.

13. The air inlet of claim 11 or 12, wherein the screw shaft is formed with a circular outside groove along the radius of the radial hole and the intermediate piece is formed with a circular inner groove in the region of the radial hole, both circular grooves cooperating to form a circular channel about the screw shaft.

* * * * *